United States Patent
Yang

(10) Patent No.: US 8,149,617 B2
(45) Date of Patent: Apr. 3, 2012

(54) DATA STORAGE MEDIUM AND METHOD FOR ACCESSING DIGITAL DATA THEREIN

(76) Inventor: Ching-Hsi Yang, Taipei (TW)

(*) Notice: Subject to any disclaimer, the term of this patent is extended or adjusted under 35 U.S.C. 154(b) by 1457 days.

(21) Appl. No.: 11/672,216

(22) Filed: Feb. 7, 2007

(65) Prior Publication Data

US 2008/0186625 A1  Aug. 7, 2008

(51) Int. Cl.
 - *G11C 11/14* (2006.01)
 - *G11C 11/00* (2006.01)
 - *G11C 11/15* (2006.01)

(52) U.S. Cl. .................. 365/171; 365/130; 365/173

(58) Field of Classification Search .............. 365/171
See application file for complete search history.

(56) References Cited

U.S. PATENT DOCUMENTS

| | | | | |
|---|---|---|---|---|
| 5,583,727 | A  * | 12/1996 | Parkin | 360/324 |
| 7,678,287 | B2 * | 3/2010  | Landis | 216/22 |
| 7,697,352 | B2 * | 4/2010  | Yang | 365/189.14 |
| 7,961,491 | B2 * | 6/2011  | Lee et al. | 365/81 |
| 7,969,773 | B2 * | 6/2011  | Yang | 365/171 |
| 7,974,031 | B2 * | 7/2011  | Dobin et al. | 360/44 |
| 2007/0037018 | A1 * | 2/2007 | Futamoto et al. | 428/828.1 |
| 2008/0085424 | A1 * | 4/2008 | Dobin et al. | 428/826 |

* cited by examiner

*Primary Examiner* — Son Mai
(74) *Attorney, Agent, or Firm* — WPAT, PC; Justin King

(57) ABSTRACT

A data storage medium is described. The data storage medium may comprise a first bit of magnetic medium for a first read-and-write head, and further comprise a second bit of magnetic medium. The second bit of magnetic medium, below the first bit of magnetic medium, may be for a second read-and-write head.

15 Claims, 6 Drawing Sheets

DATA STORAGE MEDIUM AND METHOD FOR ACCESSING DIGITAL DATA THEREIN

FIELD OF THE INVENTION

This invention relates generally to a recording technology, and more particular, to a data storage medium and method for accessing digital data stored therein.

BACKGROUND

As electronic technologies are fast developed, hardware and software are both quickly and continuously improved. Nowadays, digital data access devices fall into three main categories: the magnetic disk, the compact disk (CD) and the flash memory. The magnetic disk utilizes magnetic properties of magnetic media for data storage. The magnetic disk further falls into two categories: the fixed hard disk drive (HD) and the portable floppy disk drive. Common magnetic media includes magnetic disks, magnetic tapes . . . etc. They are most commonly used in modern computer systems for data storage.

The compact disk, usually referred to as a small disk, utilizes optical burning for digital data storage. The compact disk has a data storage structure separated into two levels: the session level and the track level. The compact disk is advantageous with its large data capacity and portability today. However, compared to data capacity, reading speed and reusability of the hard disk drive, the compact disk cannot replace the hard disk drive.

The hard disk drive is also not replaced by the floppy disk drive. The floppy disk drive, used for common personal computers, is advantageous with its portability. However, as the demand amount for data exchange grows larger and larger, the small-data-capacity and slow-reading-speed floppy disk drives are gradually eliminated through competition.

With large data capacity and fast reading speed, the hard disk drive is the most popular data access apparatus in current computer systems. The hard disk drive comprises a plurality of magnetic disks on which data are stored magnetically. Each magnetic disk has two surfaces for data storage; each surface of the magnetic disk has a plurality of concentric circular areas called tracks. Each track is separated into a plurality of sectors. A sector is the smallest unit for data access in a disk drive.

The cylinder, head and sector are the three major parts of a hard disk drive. The cylinder is formed by a plurality of tracks at corresponding positions on different disks. The head is corresponded to the number of disk surfaces. The sector is a common unit used for both the hard and floppy disk drives, and is the smallest unit for data access in a disk drive. A sector has a size of 512 bytes.

The above cylinder and head, where the target sector locates, determine the addressing or mapping work for a hard disk drive. This addressing or mapping method is called the CHS (Cylinder Head Sector) mapping or CHS addressing method. However, during the method was developed, the IDE interface, which is used for integrating the hard disk into the personal computer system, could support a single hard disk drive only 512 MB as the maximum capacity.

Later, Large mode, a new working mode for the addressing method, came out and solved the problem. The Large mode enables the hard disk to have a capacity up to 2 GB. Another more popular addressing method for the hard disk drive is the Logical Block Addressing (LBA). LBA is able to support hard disks with capacity more than 8.4 GB.

The logical block addressing method utilizes logical reflection for addressing specific sectors and is broadly used in some of the common interfaces devices in current personal computer systems like enhanced IDE interface devices and small computer system interface (SCSI) devices. Conventional addressing/mapping works for the hard disk drive are physical addressing/mapping. For example, we can track a sector to a detail of on which disk and track the sector is. This kind of description for the sector location also represents the physical location of the sector in a hard disk drive in reality.

Accordingly, the compact disk is easy to carry but it still is not a choice for replacing the conventional hard disk drive (HDD) for the unsolved limitations such as the data capacity and reading speed.

A number of technological challenges affect the HDD industry. One goal is to squeeze more data bits into available storage space. To achieve this goal, the data bits are written inductively by a perpendicular-recording technology, rather than a conventional longitudinal-recording technology. The perpendicular-recording technology may enable smaller bit size and increase storage density. However, those advantages of the perpendicular-recording technology are limited, because the bits of magnetic medium of a data storage medium are arranged in only one plane orthogonal to a read-and-write head.

SUMMARY

In one aspect of the present invention, a data storage medium is provided. The data storage medium may comprise a first bit of magnetic medium for a first read-and-write head, and further comprise a second bit of magnetic medium. The second bit of magnetic medium, below the first bit of magnetic medium, may be for a second read-and-write head.

In another aspect of the present invention, another data storage medium is provided. The data storage medium may comprise a first bit of magnetic medium and a second bit of magnetic medium. The first bit of magnetic medium may be for a read-and-write head to access a first digital data. The second bit of magnetic medium, below the first bit of magnetic medium, may be for the read-and-write head to access a second digital data.

In yet another aspect of the present invention, an accessing method is provided. The accessing method may comprise a step of accessing a first digital data stored in a first bit of magnetic medium below a second bit of magnetic medium.

DETAILED DESCRIPTION OF THE INVENTION

Figure 1A:
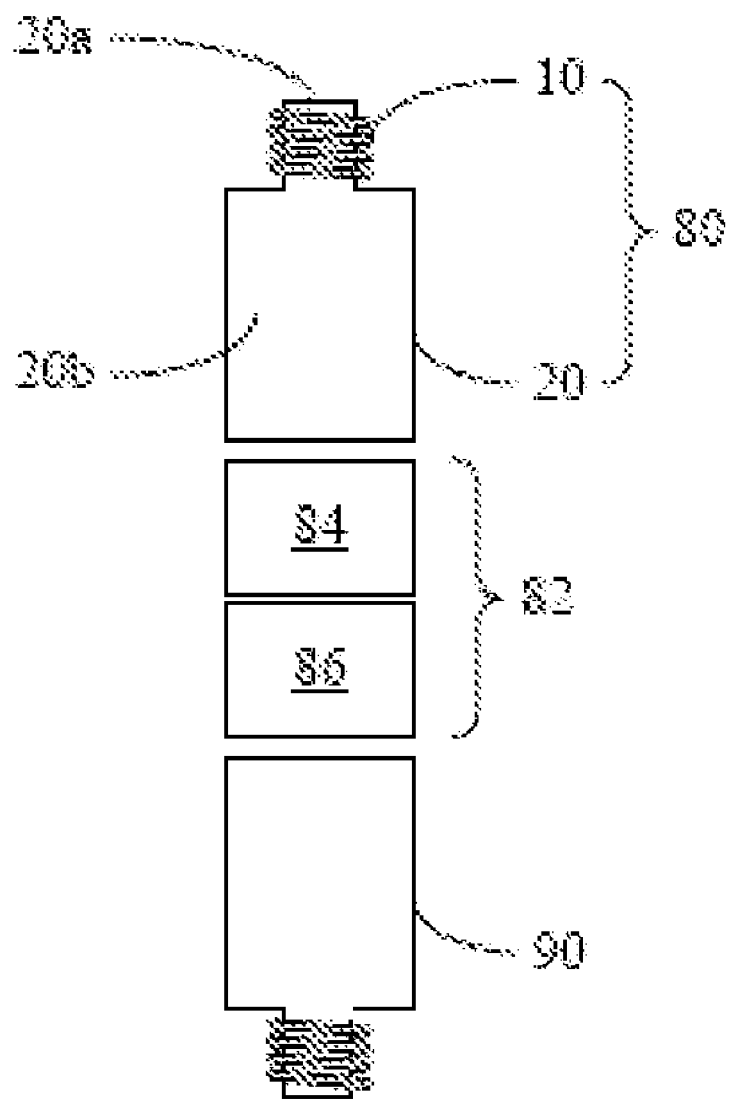
FIG. 1A schematically illustrates a storage medium is provided in accordance with a first embodiment in the present invention.

The present invention is related to a data storage medium. The structure and working mechanism will now be described in greater detail to make the present invention more readily appreciated. Obviously, the present invention should not be limited in the details known to those skilled in the art, and well known devices will not be described herein to avoid unnecessary limitations. Preferred embodiments will now be described in greater detail. Nevertheless, it should be recognized that the present invention can be practiced in a wide range of other embodiments besides those explicitly described, and the scope of the present invention is expressly not limited except as specified in the accompany claims Reference is now made to FIG. 1A, in a first embodiment of the present invention, a storage medium 82 and a first read-and-write head 80 is provided. The first read-and-write head 80 may comprise a first coil 10 and a first pillar 20. The first pillar 20 may be magnetizable, and may have a flask shape. The first flask-shaped pillar 20 has a first neck 20a and a first body 20b. The first neck 20a of the first flask-shaped pillar 20 is wrapped in the first coil 10.

The data storage medium 82 may comprise a first bit of magnetic medium 84 and a second bit of magnetic medium 86. The first bit of magnetic medium 84 may be for the first read-and-write head 80 to access a first digital data. The second bit of magnetic medium 86 may be below the first bit of magnetic medium 84. Different from a conventional data storage medium, the first bit of magnetic medium 84 and the second bit of magnetic medium 86 of the present invention are arranged to substantially align with the first read-and-write head 80, rather than arranged in a plane orthogonal to the read-and-write head 80. This arrangement increases the storage "space" of the hard disk.

The second bit of magnetic medium 86 may be for a second read-and-write head 90 to access a second digital data. The first digital data and the second digital data may be respectively stored in the first bit of magnetic medium 84 and the second bit of magnetic medium 86.

The first bit of magnetic medium 84 may have a first magnetic field. The second bit of magnetic medium 86 may have a second magnetic field. The magnetic field may be detected through the second read-and-write head 90, to access the second digital data. The second digital data is indicated by the second magnetic field of the second bit of magnetic medium 86.

Preferably, the second read-and-write head 90 is below the second bit of magnetic medium 86 and the first bit of magnetic medium 84. The second read-and-write head 90 may be aligned with or orthogonal to the magnetic field of the second bit of magnetic medium 86. If a perpendicular-recording technology is applied, the second read-and-write head 90 is aligned with the first magnetic field of the second bit of magnetic medium 86. If a longitudinal-recording technology is applied, the second read-and-write head 90 is orthogonal to the first magnetic field of the second bit of magnetic medium 86.

Figure 1B:
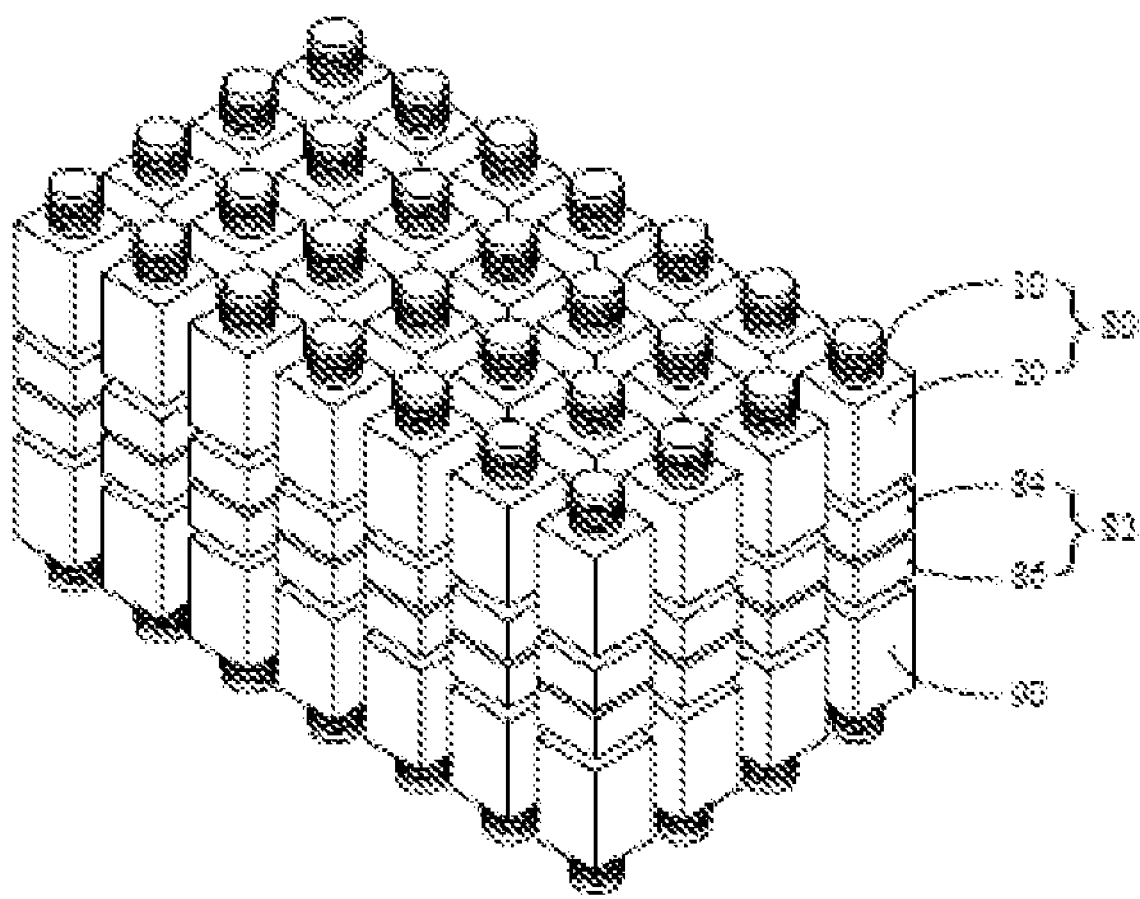
FIG. 1B schematically illustrates a plurality of storage mediums are provided in accordance with a first embodiment in the present invention.

FIG. 1B schematically illustrates a plurality of storage mediums are provided in accordance with a first embodiment in the present invention. As shown in FIG. 1B, the storage mediums 82 and a plurality of first read-and-write heads 80 are arranged.

Figure 2:
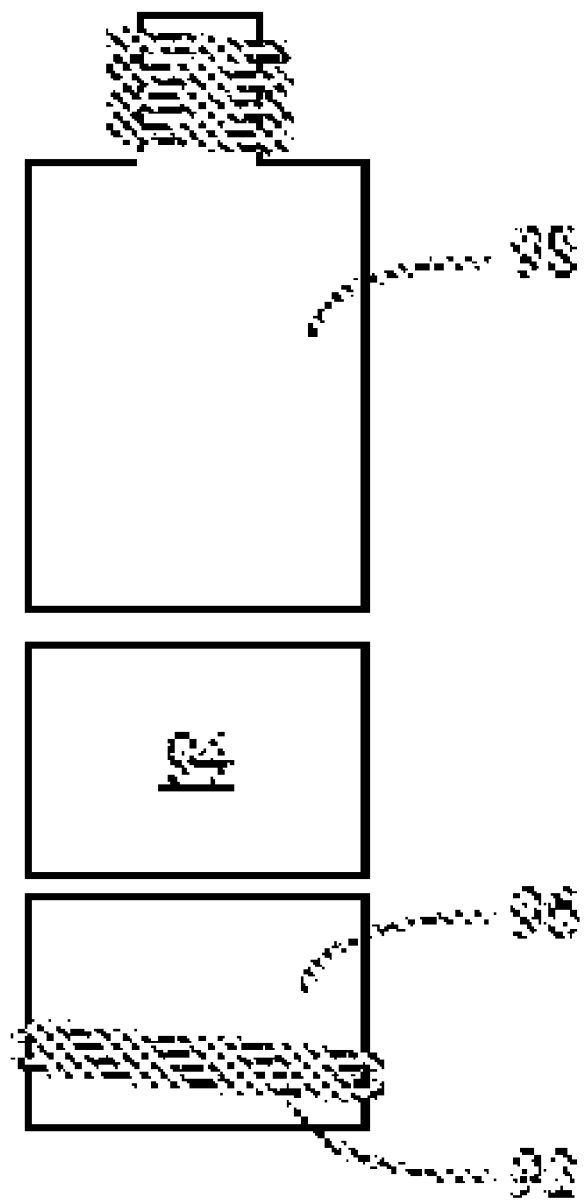
FIG. 2 schematically illustrates a storage medium is provided in accordance with a second embodiment in the present invention.

Reference is now made to FIG. 2, in a second embodiment of the present invention, a storage medium is provided. The data storage medium may comprise a first bit of magnetic medium 94 and a second bit of magnetic medium 96. The first bit of magnetic medium 94 may be for a read-and-write head 98 to access a first digital data. The second bit of magnetic medium 96 may be below the first bit of magnetic medium 94. Different from a conventional data storage medium, the first bit of magnetic medium 94 and the second bit of magnetic medium 96 of the present invention are arranged to substantially align with the first read-and-write head 98, rather than arranged in a plane orthogonal to the read-and-write head 98. This arrangement increases the storage "space" of the hard disk.

The second bit of magnetic medium 96 may be for the read-and-write head 98 to access a second digital data. The second bit of magnetic medium 96 may have a first magnetic field indicating the second digital data. The read-and-write head 98 may be aligned with or orthogonal to the first magnetic field of the second bit of magnetic medium 96. If a perpendicular-recording technology is applied, the read-and-write head 98 is aligned with the first magnetic field of the second bit of magnetic medium 96. If a longitudinal-recording technology is applied, the read-and-write head 98 is orthogonal to the first magnetic field of the second bit of magnetic medium 96.

The second bit of magnetic medium 96 may be partially wrapped in an electrically conductive coil 92. The electrically conductive coil 92 may be induced to have an electrical current when the first magnetic field is changed to a second magnetic field.

The induced current is for a user to read a third digital data collectively through the electrically conductive coil 92 and the read-and-write head 98. For example, the read-and-write head 98 may generate a magnetic field strong enough to change the first magnetic field with the second magnetic field of the second bit of the magnetic medium, through the first bit of the magnetic medium 94. This change induces the electrically conductive coil 92 to have the electrical current. The electrical current may be detected, so that the third digital data is accessed by this detection.

In a third embodiment of the present invention, an accessing method is provided. The accessing method may comprise a step of accessing a first digital data stored in a first bit of magnetic medium below a second bit of magnetic medium. The first digital data is indicated by a first magnetic field of the first bit of magnetic medium. The first magnetic field may be detected through a read-and-write head. The read-and-write head is orthogonal to or preferably aligned with the first magnetic field of the first bit of magnetic medium. If a perpendicular-recording technology is applied, the read-and-write head is aligned with the first magnetic field of the second bit of magnetic medium. If a longitudinal-recording technology is applied, the read-and-write head is orthogonal to the first magnetic field of the second bit of magnetic medium.

The first bit of magnetic medium may have a second magnetic field. The second magnetic field may be changed by the read-and-write head. The read-and-write head may be below the first bit of magnetic medium, or alternatively be above the second bit of magnetic medium. In the later case, the read-and-write head may generate a magnetic field strong enough to change the second magnetic field of the first bit of magnetic medium, through the second bit of magnetic medium, to the first magnetic field of the first bit of magnetic medium.

The first magnetic field may be detected through the read-and-write head and an electrically conductive coil partially wrapping the first bit of magnetic medium. The electrically conductive coil is induced by the change from the second magnetic field to the first magnetic field of the first bit of magnetic medium, thereby having an induced current. The induced current may be detected, so that the first magnetic field is detected.

Figure 3:
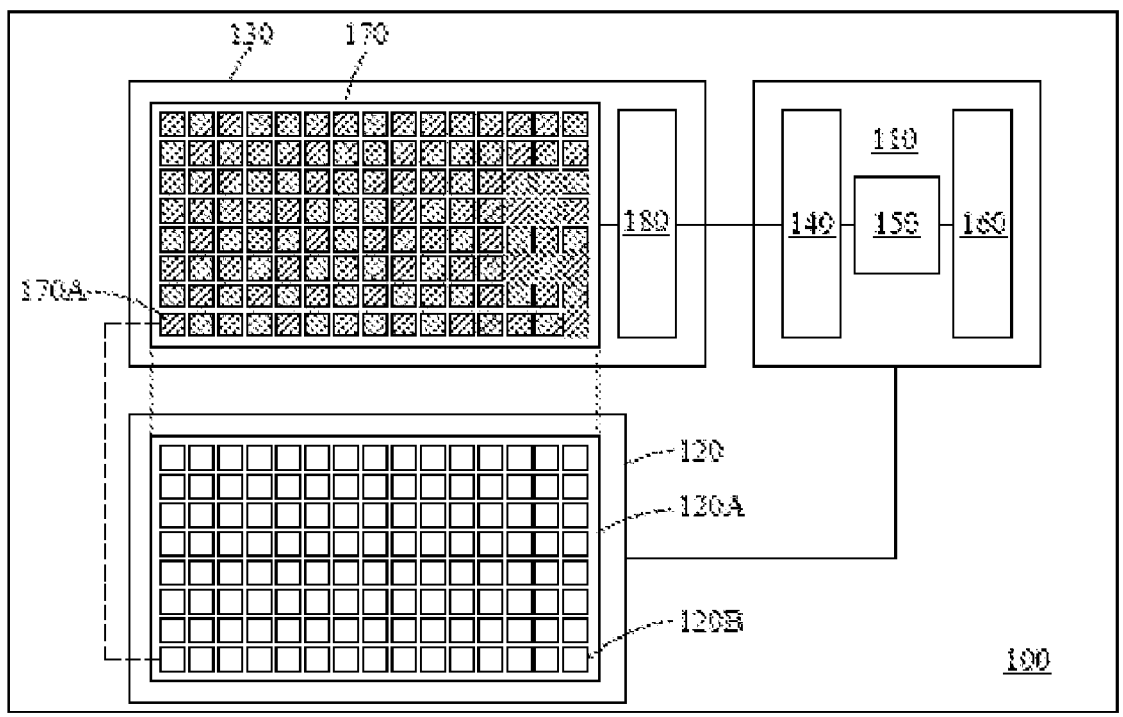
FIG. 3 is a block diagram illustrating the fixed-address digital data access system in accordance with a fourth embodiment in the present invention.

Reference is now made to FIG. 3, in a fourth embodiment of the present invention, a fixed-address digital data access system 100 is provided. The system 100 comprises a control module 110, a storage module 120 and an access module 130 wherein the control module 110 is electrically coupled with the access module 130 in order to control the access module 130; and the storage module 120 is removable. The control module 110 further comprises a connection interface 140, a control sub-circuitry 150 and at least one transmission interface 160, wherein the control sub-circuitry 150 is electrically coupled with the connection interface 140 and the at least one transmission interface 160, respectively; the system 100 communicates and exchange signals with external electronic devices via the transmission interface 160. The access module 130 further comprises an electromagnetic-inductive sub-circuitry 180 and an electromagnetic-inductive area 170 with a plurality of micro-data access devices 170A.

Each of the micro-data access devices 170A, for example, includes the first coil and the first magnetizable pillar in the first embodiment of the present invention. The electromagnetic-inductive area 170 is electrically coupled with the electromagnetic-inductive sub-circuitry 180 and each of the micro-data access devices 170A is specifically located in the electromagnetic-inductive area 170.

Referring to FIG. 3, in this fourth embodiment, the storage module 120 further comprises at least one electromagnetic-inductive medium 120A wherein the at least one electromagnetic-inductive medium 120A of the storage module 120 is corresponding to the electromagnetic-inductive area 170 of the access module 130 with respect to the data access address. The at least one electromagnetic-inductive medium 120A has a plurality of digital data access areas 120B located therein according to a pre-determined order such that the plurality of digital data access areas 120B are corresponding to the plurality of micro-data access devices 170A with respect to the data access address, and that each of the micro-data access devices 170A is able to read and store digital data with corresponding digital data access area 120B thereof. Each of the digital data access areas 120B is, for example, the first bit of storage medium or the second bit of storage medium in the first or second embodiment of the present invention.

When inserted in the fixed-address digital data access system 100, the storage module 120 receives power from the fixed-address digital data access system 100 such that the power needed by the access module 130 is reduced. Further, the storage module 120 is electrically coupled with the control module 110 whereby the control sub-circuitry 150 is able to control a specifically located micro-data access device 170A and the corresponding digital data access area 120B thereof at the same time. A conductive material is further used to make a part of the at least one electromagnetic-inductive medium 120A to strengthen the electromagnetic effect. The fixed-address digital data access system 100 works as follows: Initially, the storage module 120 is inserted into the fixed-address digital data access system 100. When digital data at a specific data access address are requested, an external electronic device transmits an access signal to the control module 110 via the at least one transmission interface 160 to read the data needed. Then, the control sub-circuitry 150 of the control module 110 transmits a control signal to the electromagnetic-inductive sub-circuitry 180 via the connection interface 140 to control the micro-data access device 170A and the corresponding electromagnetic medium 120A thereof for reading the requested digital data from the digital data access area 120B at the target data access address.

Figure 4:
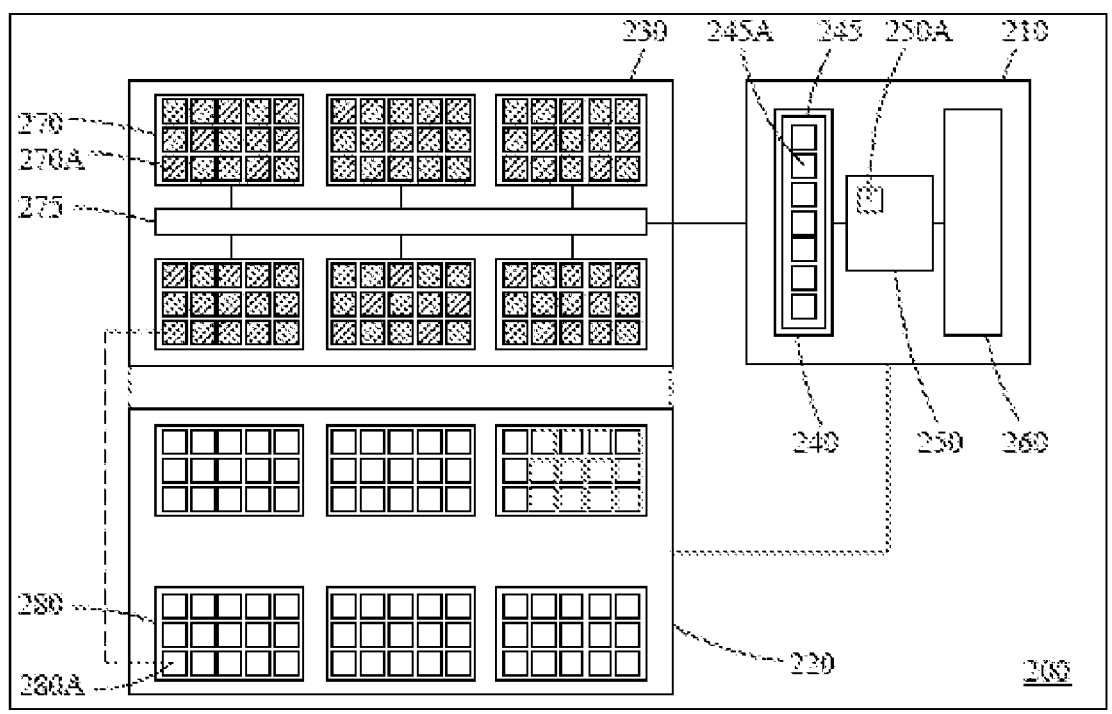
FIG. 4 is a block diagram illustrating the fixed-address digital data access system in accordance with a fifth preferred embodiment in the present invention.

Reference is now made to FIG. 4, in a fifth embodiment of the present invention, a fixed-address digital data access system 200 is provided. The system 200 comprises a control module 210, a storage module 220 and an access module 230 wherein the control module 210 is electrically coupled with the access module 230 in order to control the access module 230; and the storage module 220 is removable. The control module 210 further comprises a connection interface 240, a control sub-circuitry 250 and at least one transmission interface 260 wherein the control sub-circuitry 250 is electrically coupled with the connection interface 240 and the at least one transmission interface 260; the system 200 communicates and exchanges signals with external electronic devices via the transmission interface 260.

The control sub-circuitry 250 further comprises at least one data access address table 250A for storing information about a plurality of data access addresses; the connection interface 240 comprises a switch sub-circuitry 245 for controlling a plurality of electromagnetic-inductive areas 270; the switch sub-circuitry 245 has a plurality of data access address switches 245A wherein each of the data access address switches 245A is corresponding to a single item in the data access address table 250A such that the control sub-circuitry 250 is able to control the plurality of data access address switches 245A of the switch sub-circuitry 245. The access module 230 further comprises an electromagnetic-inductive sub-circuitry 275 which has a plurality of electromagnetic-inductive areas 270; a plurality of micro-data access devices 270A are set in the electromagnetic-inductive area 270; and each micro-data access device 270A is set according to the data access address table 250A. The plurality of micro-data access devices 270A are electrically coupled with the plurality of data access address switches 245A in the switch sub-circuitry 245 via the electromagnetic-inductive sub-circuitry 275.

Referring to FIG. 4, in this fifth embodiment, the storage module 220 further comprises a plurality of electromagnetic-inductive media 280 wherein the plurality of electromagnetic-inductive media 280 are corresponding to the plurality of electromagnetic-inductive areas 270 of the access module 230 with respect to the data access address for electromagnetic data access. Each of the electromagnetic-inductive media 280 has a plurality of digital data access areas 280A located therein according to the data access address table 250A, in order to enable the plurality of digital data access areas 280A to correspond to the plurality of micro-data access devices 270A with respect to the data access address. Each of the micro-data access devices 270A, for example, includes the first coil and the first magnetizable pillar in the first embodiment of the present invention. Each of the digital data access areas 280A is, for example, the first bit of storage medium or the second bit of storage medium in the first or second embodiment of the present invention.

When inserted in the fixed-address digital data access system 200, the storage module 220 receives power from the fixed-address digital data access system 200 such that the power needed by the access module 230 is reduced. Further, the storage module 220 is electrically coupled with the control module 210 whereby the control sub-circuitry 250 is able to control a specifically located micro-data access device 270A and the corresponding digital data access area 280A thereof at the same time. A conductive material is further used to make a part of each electromagnetic-inductive medium 280 to strengthen the electromagnetic effect. The fixed-address digital data access system 200 works as follows: Initially, the storage module 220 is inserted into the fixed-address digital data access system 200. When digital data at a specific data access address are requested, an external electronic device transmits an access signal to the control module 210 via the at least one transmission interface 260 to read the data needed. Then, the control sub-circuitry 250 of the control module 210 transmits a control signal to the switch sub-circuitry 245 of the connection interface 240 according to the data access address table 250A to turn on an data access address switch 245A specifically located. After that, the control signal is further transmitted to the electromagnetic-inductive sub-circuitry 275 of the access module 230 via the data access address switch 245A to control a specifically located micro-data access device 270A of the electromagnetic-inductive area 270 and the corresponding electromagnetic medium 280 thereof of the storage module 220 for reading the requested digital data from the digital data access area 280A at the target data access address.

Figure 5:
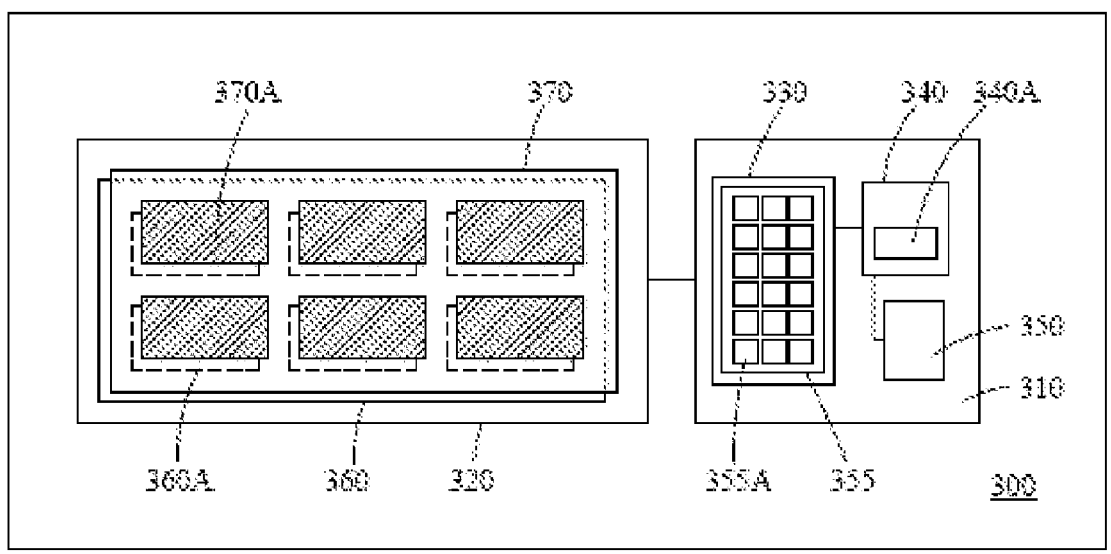
FIG. 5 is a block diagram illustrating the fixed-address digital data access system in accordance with a sixth preferred embodiment in the present invention.

Reference is now made to FIG. 5, in a sixth embodiment of the present invention, a fixed-address digital data access system 300 is provided. The system 300 comprises a control module 310 and an access module 320 wherein the control module 310 is electrically coupled with the access module 320 in order to control the access module 320; and the access module 320 is removable. The control module 310 further comprises a connection interface 330, a control sub-circuitry 340 and at least one transmission interface 350, wherein the control sub-circuitry 340 is electrically coupled with the connection interface 330 and the at least one transmission interface 350, respectively; the system 300 communicates and exchanges signals with external electronic devices via the at least one transmission interface 350; the access module 320 is electrically coupled with the control module 310 via the connection interface 330. The control sub-circuitry 340 further comprises at least one data access address table 340A for storing information about a plurality of data access addresses; the connection interface 330 comprises a switch sub-circuitry 355 for controlling a plurality of electromagnetic-inductive circuitries 370A.

Each of the electromagnetic-inductive circuitries 370A may be the first read-and-write head in the first embodiment of the present invention, or may be the read-and-write head in the second embodiment of the present invention. The switch sub-circuitry 355 has a plurality of data access address switches 355A wherein each of the data access address switches 355A is corresponding to a single item in the data access address table 340A such that the control sub-circuitry 340 is able to control the plurality of data access address switches 355A of the switch sub-circuitry 355. The access module 320 comprises at least one magnetic film 360 and an electromagnetic-inductive sub-circuitry 370 having a plurality of electromagnetic-inductive circuitries 370A, wherein the at least one magnetic film 360 is set in the plurality of electromagnetic-inductive circuitries 370A of the electromagnetic-inductive sub-circuitry 370 and the electromagnetic-inductive sub-circuitry 370 is electrically coupled with the switch sub-circuitry 355 such that each of the data access address switches 355A can also be electrically coupled with each of the electromagnetic-inductive circuitries 370A according the data access address table 340A.

Referring to FIG. 5, in this sixth embodiment, the at least one magnetic film 360 further comprises a plurality of data access areas 360A wherein the plurality of data access areas 360A are set in the plurality of electromagnetic-inductive circuitries 370A according to the data access address table 340A for electromagnetic digital data access.

Each of the plurality of electromagnetic-inductive circuitries 370A may be the first read-and-write head in the first embodiment of the present invention, or may be the read-and-write head in the second embodiment of the present invention. The control sub-circuitry 340 is able to control a specifically located electromagnetic-inductive circuitry 370A and the corresponding digital data access area 360A thereof at the same time via the connection interface 330. A conductive material is further used to make a part of the at least one magnetic film 360 to strengthen the electromagnetic effect. The fixed-address digital data access system 300 works as follows: Initially, the access module 320 is inserted into the fixed-address digital data access system 300. When digital data at a specific access address are requested, an external electronic device transmits an access signal to the control module 310 via the at least one transmission interface 350 to read the data needed. Then, the control sub-circuitry 340 of the control module 310 transmits a control signal to the switch sub-circuitry 355 of the connection interface 330 according to the data access address table 340A to turn on a specific data access address switch 355A. After that, the control signal is further transmitted to the electromagnetic-inductive sub-circuitry 370 of the access module 320 via the data access address switch 355A to control a specific micro-data access device 370A and the corresponding digital data access area 360A thereof of the at least one magnetic film 360 for reading the requested digital data from the digital data access area 360A at the target address.

Accordingly, in the preferred embodiments of the present invention, each of the plurality of the micro-data access devices or access circuitry is respectively set at specific addresses in the digital data access systems provided, which is totally different from the conventional hard disk drive data access mechanism. The present invention can be applied to any other digital data access system, and the mechanism for data access mentioned above has not been disclosed or developed in any digital data access system.

Obviously, many modifications and variations are possible in light of the above teachings. It is therefore to be understood that within the scope of the appended claims the present invention can be practiced otherwise than as specifically described herein. Although specific embodiments have been illustrated and described herein, it is obvious to those skilled in the art that many modifications of the present invention may be made without departing from what is intended to be limited solely by the appended claims.

What is claimed is:

1. A data storage medium, comprising:
   a first bit of magnetic medium for a first read-and-write head; and
   a second bit of magnetic medium, below the first bit of magnetic medium, for a second read-and-write head.

2. The data storage medium of claim 1, wherein the second bit of magnetic medium has a magnetic field.

3. The data storage medium of claim 2, wherein the magnetic field is detected through the second read-and-write head.

4. The data storage medium of claim 3, wherein the second read-and-write head is below the second bit of magnetic medium and the first bit of magnetic medium.

5. The data storage medium of claim 2, wherein second the read-and-write head is aligned with the magnetic field of the second bit of magnetic medium.

6. A data storage medium, comprising:
   a first bit of magnetic medium for a read-and-write head to access a first digital data; and a second bit of magnetic medium, below the first bit of magnetic medium, for the read-and-write head to access a second digital data, wherein said second bit of magnetic medium is partially wrapped in an electrically conductive coil.

7. The data storage medium of claim 6, wherein the second bit of magnetic medium has a magnetic field.

8. The data storage medium of claim 7, wherein the magnetic field is for indicating the second digital data.

9. The data storage medium of claim 8, wherein the electrically conductive coil is for the detecting the magnetic field.

10. The data storage medium of claim 7, wherein the read-and-write head is aligned with the magnetic field of the second bit of magnetic medium.

11. An accessing method, comprising:
   accessing a digital data stored in one bit of magnetic medium below another bit of magnetic medium, wherein said digital data is indicated by a magnetic field of the one bit of magnetic medium, and said magnetic field is detected through a read-and-write head and an electrically conductive coil partially wrapping the one bit of magnetic medium.

12. The accessing method of claim 11, wherein the magnetic field is detected through a read-and-write head.

13. The accessing method of claim 12, wherein the read-and-write head is below the one bit of magnetic medium and the another bit of magnetic medium.

14. The accessing method of claim 13, wherein the read-and-write head is aligned with the magnetic field of the one bit of magnetic medium.

15. The accessing method of claim 11, wherein the read-and-write head is aligned with the magnetic field of the one bit of magnetic medium.

* * * * *